April 13, 1965 T. D. KEGELMAN 3,178,651

DIFFERENTIAL AMPLIFIER

Filed Aug. 3, 1961 3 Sheets-Sheet 1

INVENTOR.
THOMAS D. KEGELMAN
BY
ATTORNEY

INVENTOR.
THOMAS D. KEGELMAN
BY Henry L. Shenier
ATTORNEY

April 13, 1965 T. D. KEGELMAN 3,178,651

DIFFERENTIAL AMPLIFIER

Filed Aug. 3, 1961 3 Sheets-Sheet 3

INVENTOR.
THOMAS D. KEGELMAN
BY Henry L. Shenier
ATTORNEY 3,178,651
Patented Apr. 13, 1965

3,178,651

DIFFERENTIAL AMPLIFIER

Thomas D. Kegelman, West Nyack, N.Y., assignor to United Aircraft Corporation, East Hartford, Conn., a corporation of Delaware Filed Aug. 3, 1961, Ser. No. 129,182
6 Claims. (Cl. 330—69)

My invention relates to a differential amplifier and more particularly to an improved circuit for obtaining sums and differences of a plurality of input signals in a simple, expeditious and accurate manner.

Differential amplifiers are known in the prior art for performing addition and subtraction operations on a number of signals to produce outputs suitable for analogue computations. One of the difficulties encountered with devices of this type known in the prior art is that owing to loading of the various elements the results prdouced are not as accurate as is desirable. Moreover, as the number of input signals increases, the circuits become exceedingly complex and involved for the result produced.

I have invented a differential amplifier which overcomes the defects of differential amplifiers of the prior art. The accuracy of the result produced by my amplifier is not appreciably affected by loading of the circuit elements. My amplifier is readily adapted to handle a very large number of input signals. It will accomplish various combinations of addition and subtraction operations. My circuit is extremely simple for the result it achieves.

One object of my invention is to provide a differential amplifier which overcomes the defects of amplifiers of the prior art.

Another object of my invention is to provide a differential amplifier which is readily adapted to perform multiple addition and subtraction operations on a large number of input signals.

A further object of my invention is to provide a differential amplifier which produces accurate results in that the elements thereof are not appreciably affected by loading.

A still further object of my invention is to provide a differential amplifier which is extremely simple for the result it achieves.

Other and further objects of my invention will appear from the following description.

In general my invention contemplates the provision of a differential amplifier for producing multiple addition and subtraction operations on a plurality of input signals in which a plurality of parallel connected electron devices are coupled to another electron device providing a controlled current source. Each device has a signal input terminal. I so arrange my differential amplifier circuit that in response to various input signals applied to the input terminals the output terminals carry signals representing various addition and subtraction operations.

In the acocmpanying drawings which form part of the instant specification and which are to be read in conjunction therewith and in which like reference numerals are used to indicate like parts in the various views.

Figure 1:
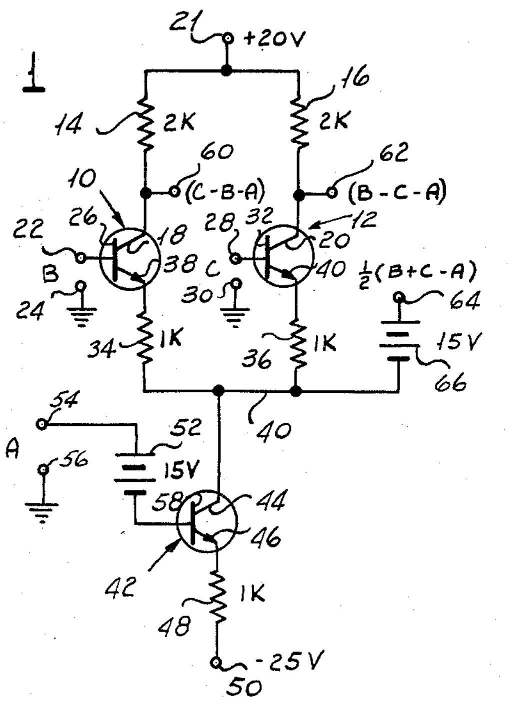
FIGURE 1 is a schematic view of the form of my differential amplifier adapted to handle two or three input signals.

Referring now to FIGURE 1 of the drawings, the form of my differential amplifier illustrated therein includes a pair of n-p-n transistors, indicated generally by the reference characters 10 and 12. Respective collector resistors 14 and 16 connect the collectors 18 and 20 of transistors 10 and 12 to the positive terminal 21 of a suitable source of potential. I connect one terminal 22 of a pair of input terminals 22 and 24 to the base 26 of transistor 10 and connect the other terminal 24 to ground. I connect one terminal 28 of a pair of terminals 28 and 30 to the base 32 of transistor 12 and I connect the terminal 30 to ground. Respective emitter resistors 34 and 36 connect the emitters 38 and 40 of transistors 10 and 12 to a common conductor 40.

I connect a current control transistor 42 in the emitter circuits of transistors 10 and 12 by connecting the collector 44 of transistor 42 to conductor 40 and by connecting the emitter 46 of transistor 42 to a resistor 48 connected to the negative terminal 50 of a suitable source of potential. I connect a battery 52 between one terminal 54 of a pair of input terminals 54 and 56 to the base 58 of transistor 42 to reference the input potential at the terminals 54 and 56 to ground in the manner to be described hereinafter. It will readily be apparent that the device 42 may be termed a "return path device" since it completes the circuit of the devices 10 and 12.

In order to explain the operation of the form of my differential amplifier shown in FIGURE 1, I have assumed certain values for the circuit elements. By way of example, each of the resistors 14 and 16 may have a value of 2K while the resistors 34, 36 and 48 each has a value of 1K. I assume for the purposes of explanation that a voltage drop of 10 volts exists across each of the transistors 10, 12 and 42. I further assume that terminal 21 is at +20 volts potential while the terminal 50 is at −25 volts. Let the letters A, B and C indicate the respective input signals applied to the terminals 54 and 56 to the terminals 22 and 24 and to the terminals 28 and 30.

Assuming that each of the input signals A, B and C is at ground or zero potential, it will be apparent that 5 ma. flows through the circuit including resistor 14, transistor 10 and resistor 34 and 5 ma. flows through the circuit including resistor 16, transistor 12 and resistor 36 with the result that 10 ma. flows through transistor 42 and resistor 48. With this current flow, conductor 40 is at −5 volts while each of the collectors 18 and 20 is at +10 volts. I obtain two of the output signals of this form of my circuit from the collectors 18 and 20 by connecting respective output terminals 60 and 62 to the collectors. It will be apparent that these output signals are referenced to +10 volts. They may, of course, be referenced to ground by subtracting this potential in any suitable manner known to the art. I obtain the third output of the form of my amplifier shown in FIGURE 1 by connecting an output terminal 64 to the conductor 40. In order to reference the output at terminal 64 to the same potential as that to which the outputs at terminals 60 and 62 are referenced I connect a battery 66 of a suitable potential such, for example, as 15 volts in the example shown between conductor 40 and terminal 64.

Under the conditions assumed above, let us consider the case in which a potential of +2 volts is applied to the input terminals 22 and 24. This potential causes a rise of 2 volts at the emitter 38 which owing to the voltage divider effect of resistors 34 and 36 results in a 1 volt rise in potential of conductor 40 from −5 volts to −4 volts. Under these conditions the potential across resistor 36 is 4 volts so that the current flowing through this resistor must be 4 ma. This represents a decrease of 1 ma. in the current flowing through resistor 16 so that the potential at terminal 62 rises by 2 volts which in effect is an output of +B at terminal 62.

It will be appreciated that with input A at ground or zero potential the transistor 42 acts as a constant current source. Thus since the current through the circuit of resistor 16, transistor 12 and resistor 36 has dropped by 1 ma., the current through the circuit including resistor 10 and resistor 34 has increased by 1 ma. This increase of current through resistor 14 causes the potential at terminal 60 to drop by 2 volts, which in effect is an output of —B at terminal 60.

The effect of a rise in potential of, for example, 2 volts at terminals 28 and 30 can be followed through in a manner similar to that outlined above and if this is done, it will be seen that it has the effect of an output of +C at terminal 60 and —C at terminal 62. Let us now consider the case where a potential of +2 volts is applied to terminals 54 and 56 with inputs B and C at ground. The 2 volt increase in potential applied to base 58 results in a 2 volt increase in the potential at emitter 46 which results in an increased current flow of 2 ma. through transistor 42 and resistor 48. This current increase is shared equally between the circuits including transistors 10 and 12 with the result that the output at each of the terminals 60 and 62 drops by 2 volts which is effectively the production of an output of —A to each of the terminals 60 and 62. It will be seen that under the conditions at which an input A is applied to the terminals 54 and 56, transistor 42 no longer acts as a constant current source but rather as a controlled current source to permit the subtraction and addition operations indicated above to result.

In a manner analogous to that outlined above for independent changes in the inputs A, B and C it can readily be demonstrated that simultaneous changes in the inputs produce such an effect that the output at terminal 60 is $(C-B-A)$ while the output at terminal 62 is $(B-C-A)$. It can further be demonstrated that the output at terminal 64 is one half $(B+C-A)$.

Figure 2:
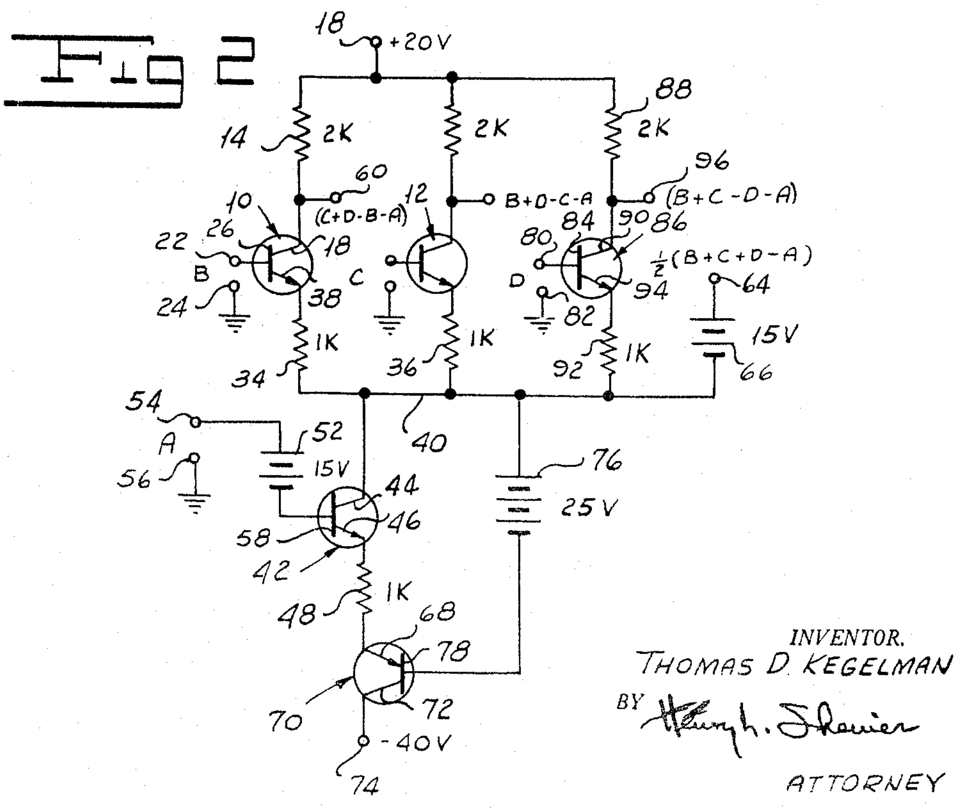
FIGURE 2 is a schematic view of the form of my differential amplifier adapted to handle four input signals.

Referring now to FIGURE 2, I have shown a form of my differential amplifier which is adapted to handle three inputs and to produce a multiplicity of addition and subtraction operations. In the circuit of FIGURE 2 in which I have indicated like parts by the same reference characters as those used in FIGURE 1, I employ the transistors 10, 12 and 42 and their associated circuit elements as shown. In this case, however, for a reason which will be apparent from the description given hereinafter rather than connecting resistor 48 to terminal 50, I connect the resistor to emitter 68 of a p-n-p transistor, indicated generally by the reference character 70, the collector 72 of which is connected to the terminal 74 of a suitable source of negative potential such, for example, as —40 volts. In this form of my invention I employ a feedback circuit including a battery 76 of a magnitude of 25 volts in the particular example shown between conductor 40 and the base 78 of transistor 70.

I apply the fourth input D of my differential amplifier to a pair of terminals 80 and 82, the terminal 80 of which is connected to the base 84 of a transistor, indicated generally by the reference character 86 and the terminal 82 of which is connected to ground. A resistor 88 of a magnitude equal to that of resistors 14 and 16 connects the collector 90 of transistor 86 to the terminal 18 while a resistor 92 of a magnitude equal to that of resistors 34 and 36 connects the emitter 94 of transistor 86 to conductor 40. I connect an output terminal 96 to collector 90.

In the specific embodiment of the form of my differential amplifier shown in FIGURE 2 in the quiescent state with all inputs A, B, C and D at ground potential, a current of 15 ma. flows through the circuit including transistor 42, resistor 48 and transistor 70. Since the voltage drop across transistor 42 and resistor 48 from conductor 40 to emitter 68 in this condition of the circuit is 25 volts, the magnitude of the battery 76 is determined as 25 volts. Further, since conductor 40 is at —5 volts and the voltage drop between this conductor and terminal 76 is 35 volts the potential of terminal 74 should be —40 volts.

In the particular circuit shown in FIGURE 2, assuming the inputs B, C and D to be zero let us consider a potential of +2 volts at input A. This causes a rise in potential at emitter 46 so that the voltage drop across resistor 48 increases and more current begins to flow through the transistor 42. This increase in current is shared equally by transistors 10, 12 and 86 with a result that the potential at conductor 40 tends to drop owing to the increased current flow through resistors 34, 36 and 92. The drop in potential at the conductor 40 is applied by the feedback circuit including battery 76 to the base 78 of transistor 70. This drop in potential at the base 78 produces an increased voltage drop across resistor 48 indicating that transistor 42 draws even more current. When with the assumed rise in potential of input A the circuit reaches a stable point, the current through resistor 48 will have increased by 3 ma. with 1 ma. increase passing through each of the resistors 34, 36 and 92. The resulting voltage drop at conductor 40 will be 1 volt.

As a second condition, assume that input A is at ground and that input B rises by 2 volts. This produces an increase in current through the transistor 10. This results in a decrease in the current through transistors 12 and 86. The effect of these current changes is to cause the current through transistor 42 to drop until the output potential at terminal 60 has risen by 2 volts and the output potential at the terminals 62 and 96 has risen by 2 volts. This ultimate result is achieved by controlling the current flow through the transistor 42 by means of the feedback circuit including the battery 76 and the transistor 70. In operation of the circuit it will produce output signals as indicated adjacent the output terminals in FIGURE 2.

Figures 3, 4:
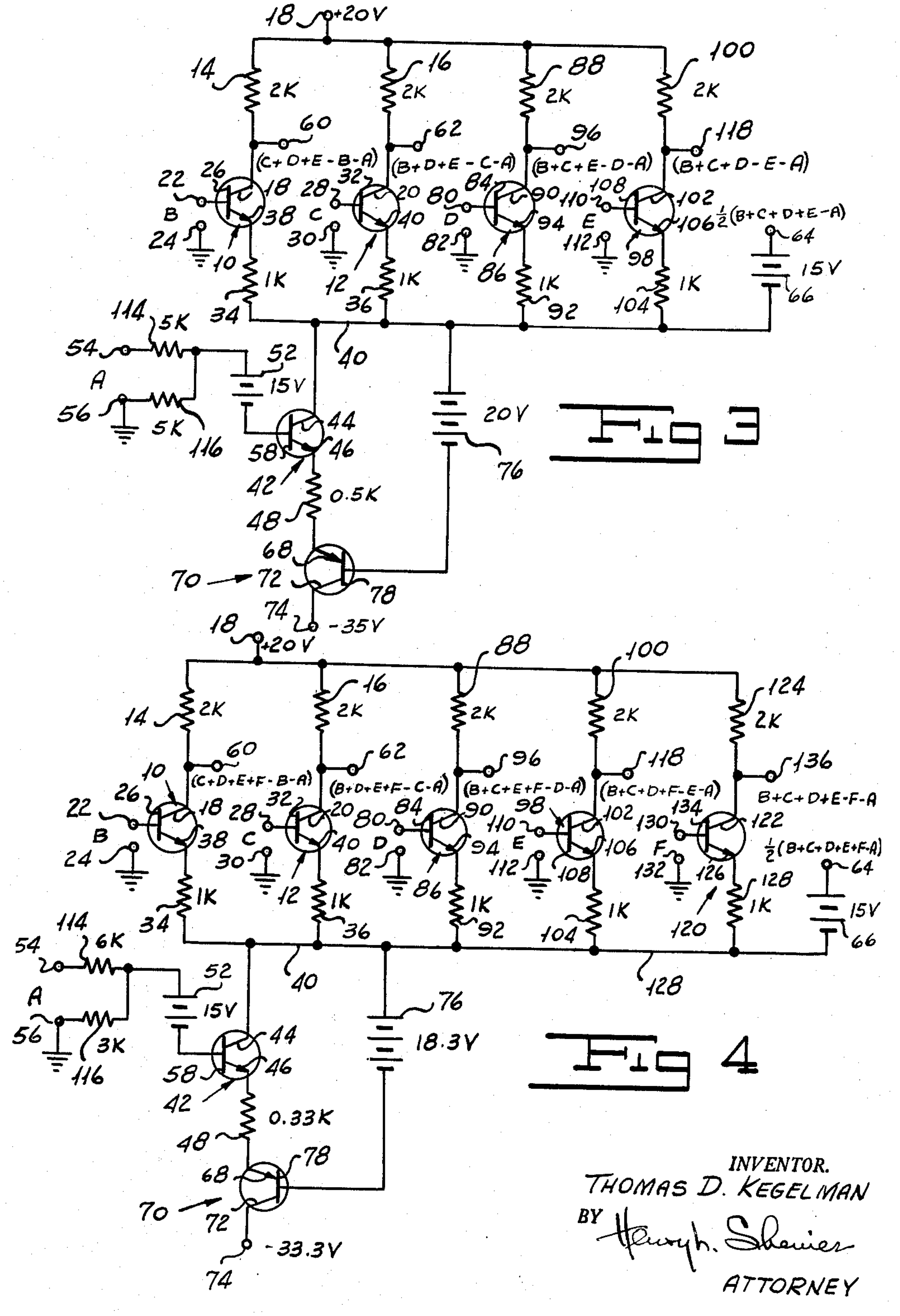
FIGURE 3 is a schematic view of a form of my differential amplifier adapted to handle five input signals.
FIGURE 4 is a schematic view of a form of my differential amplifier adapted to handle six input signals.

Referring now to FIGURE 3 of the drawings, I have shown a form of my differential amplifier which is adapted to handle five inputs. In order to achieve this result I connect still another n-p-n transistor, indicated generally by the reference character 98, between the terminal 18 and the conductor 40. A collector resistor 100 connects the collector 102 to terminal 18 while an emitter resistor 104 connects the emitter 106 to the conductor 40. I connect the base 108 to one terminal 110 of a pair of input terminals 110 and 112, the terminal 112 of which is connected to ground. It is to be noted that in this form of my differential amplifier I connect a pair of voltage dividing resistors 114 and 116 in series across the terminals 54 and 56 and connect the common terminal of these resistors to the battery 52. In the particular example shown I make the resistance of each of the voltage dividing resistors 114 and 116 5K and select a resistance of 0.5K for resistor 48. Assuming that in the quiescent condition 5 ma. flows through each of the transistors 10, 12, 86 and 98, conductor 40 is at a potential of —5 volts. Under these conditions a voltage drop of 20 volts exists across the circuit of transistor 42 and resistor 48 so that I connect a battery 76 having a potential of 20 volts between the base 78 of transistor 70 and the conductor 40. At the same time the potential at terminal 74 is determined as —35 volts. In the circuit of FIGURE 3, assuming the inputs B, C and D as well as the input E applied to terminals 110 and 112 all are zero or ground potential when the potential at input A rises by 2 volts, 1 volt is applied to the emitter 46 of transistor 42 so that more current flows through this transistor and through the resistor 48. This current change is shared equally by transistors 10, 12, 86 and 98 and it produces a drop in voltage at the conductor 40 which through the action of the feedback circuit including resistor 76 and transistor 70 further increases the current drawn by transistor 42. Ultimately in this form of the invention the current through transistor 42 increases by 4 ma. with 1 ma. of the increase being contributed by each of the branch circuits which feeds into the transistor 42.

With input A at ground and with one of the inputs B, C, D or E increasing by 2 volts, for example, the current through that transistor whose input increased begins to rise and the current through the other transistors begins to decrease. Ultimately the current through the transistor whose input increased rises by 1 ma. while the current through each of the other branch circuit transistors decreases by 1 ma. The result in this form of the circuit is a drop in current through transistor 42 of 2 ma. Owing to this action, the outputs of transistors 10, 12 and 86 will be as indicated in FIGURE 3 and transistor 98 will produce an output at a terminal 118 connected to collector 102.

Referring now to FIGURE 4, I have extended the circuit of my differential amplifier to a form which will handle six inputs in order to illustrate the manner in which a circuit having the theoretical capability of handling any number of inputs can be arrived at. In this circuit I add still another n-p-n transistor 120 having a collector 122 connected to terminal 18 by a resistor 124 and having an emitter 126 connected to conductor 40 by a resistor 128. I connect one terminel 130 of a pair of terminals 130 and 132 to the base 134 of transistor 120 and connect the other terminal 132 to ground. An output terminal 136 connected to collector 122 is adapted to carry an output signal.

The operation of the form of my invention shown in FIGURE 4 and the magnitudes of the respective elements generally are the same as those of the circuit of FIGURE 3. Exceptions are the resistors 114 and 116 which in the form of the invention shown in FIGURE 4 have respective values of 6K and 3K so that only one third of the magnitude of input A is applied by the battery 52 to the transistor 42. Resistor 48 in the circuit of FIGURE 4 has a value of 0.33K while battery 76 and terminal 74 have respective potentials of 18.3 volts and −33.5 volts. From these circuits it will be seen that the voltage dividing resistors have a relative value which is determined by the number of branch circuit transistors minus two. That is, in the circuit of FIGURE 2 where three transistors are used in the branch circuits, no voltage divider is necessary. In FIGURE 3 the number of branch circuit transistors is four, which subtracting two is two so that the input voltage A is divided in half. Where the number of branch circuit transistors is five, the input voltage A is divided by three. Similarly, it is to be noted that the resistor 48 in the circuit of FIGURE 3 has half that value which it has in the circuit of FIGURE 2 and the value of this resistor in the circuit of FIGURE 4 is one third of the value of this resistor in the circuit shown in FIGURE 2.

Figures 5, 6:
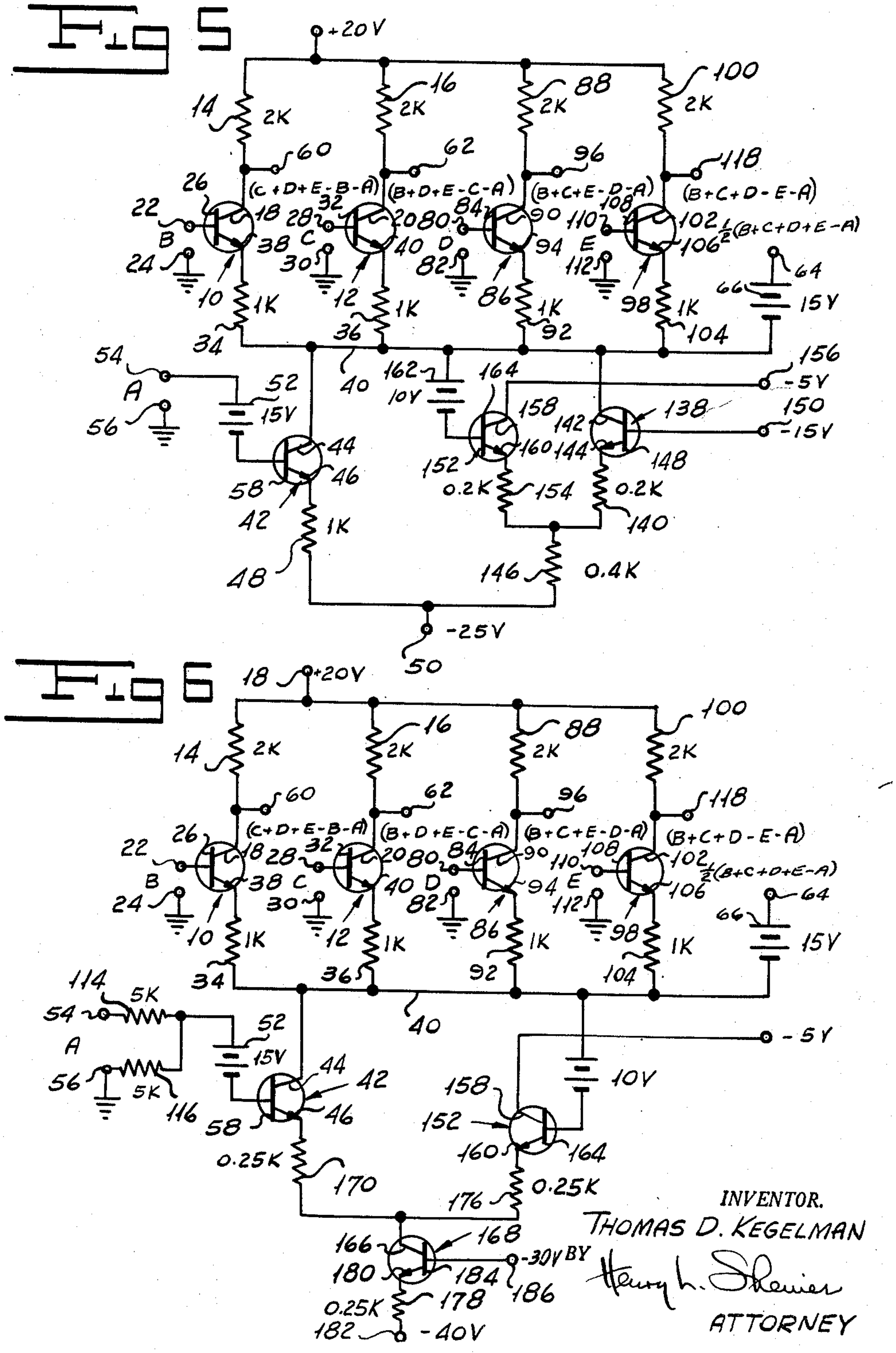
FIGURE 5 is a schematic view of an alternate form of my differential amplifier adapted to handle five input signals.
FIGURE 6 is a schematic view of still another form of my differential amplifier adapted to handle five input signals.

Referring now to FIGURE 5, I have shown an alternate form of my differential amplifier which is adapted to handle more than three inputs. I have shown a form of the invention adapted to handle five inputs. I have indicated corresponding parts in this figure by the same reference characters as those used in FIGURE 3. Rather than employing the voltage dividing resistors 114 and 116 and the transistor 70 in this form of my invention, I connect the resistor 48 directly to the terminal 50 as in the form of the invention shown in FIGURE 1. In the form of my invention shown in FIGURE 5 the portion of the circuit including transistors 10, 12 and 42 functions in the same manner as does the circuit of FIGURE 1 so that in the quiescent state each transistor 10 and 12 passes 5 ma. while transistor 42 passes 10 ma. When I add the two transistors 86 and 98 to permit me to handle two additional inputs, I must obtain ten more milliamperes of current so that in the quiescent condition the output at terminals 96 and 136 will be zero. In this form of my invention I place a transistor, indicated generally by the reference character 138, between the conductor 40 and a resistor 140 by connecting the collector 142 to conductor 40 and the emitter 144 to resistor 140. I connect a resistor 146 between resistor 140 and the terminal 50. The base 148 of transistor 138 is connected to the terminal 150 of a source of −15 volts. To provide a balanced circuit, I put a transistor, indicated generally by the reference character 152, in series with a resistor 154 between the terminal 156 of a potential of −5 volts and the resistor 146 by connecting the collector 158 to terminal 156 and the emitter 160 to resistor 154. A battery 162 connected between conductor 40 and the base 164 of transistor 152 places the base 154 at a potential of −15 volts since it will be remembered that conductor 40 is at −5 volts.

Under the conditions described above and with values of 0.2K for each of the resistors 140 and 154 and a value of 0.4K for resistor 146 transistor 138 draws 10 ma. thus supplying the 5 ma. required for each of the transistors 86 and 98. The operation of this form of my invention can be followed through in a manner analogous to that described in connection with the other forms of my invention to produce the outputs indicated. It is to be remembered that the values of the resistors 140, 146 and 154 are slightly less than 0.25K in order to increase the gain to compensate for the loss in gain due to the loading effect of resistor 146.

Referring now to FIGURE 6, the circuit illustrated in FIGURE 5 can be reduced to the form shown in FIGURE 6. In this form of my invention I connect voltage dividing resistors 114 and 116 similar to those shown in FIGURE 3 to the battery 52 which is connected to the base 58 of transistor 42. The collector 158 and the base 164 of transistor 152 are connected in the same manner as in FIGURE 5. In this form of my invention, however, I connect the emitter 46 of transistor 42 and the emitter 160 of transistor 152 to the collector 166 of a transistor, indicated generally by the reference character 168, by respective resistors 170 and 172 which in the particular form of the invention shown have values of 0.25K. A 0.25K resistor 178 connects the emitter 180 of transistor 168 to the terminal 182 of a source of −40 volts potential. I connect the base 184 of transistor 168 to the terminal 186 of a source of −30 volt potential. The operation of the form of my invention shown in FIGURE 6 is such that in the quiescent state the transistor 42 draws 20 ma. or 5 ma. for each of the branch circuits of the respective transistors 10, 12, 86, and 98. The transistor 152 operates to permit the required current changes to produce the outputs indicated when more than two branch circuits are employed. For example, if input A rises by +2 volts, then emitter 46 rises by 1 volt so that transistor 42 tends to draw more current. When this occurs, the potential of conductor 40 drops to cause transistor 152 to draw less current until in the final state of the circuit each of the branch circuits passes 1 ma. more current so that the correct output is produced at each of the terminals 60, 62, 96, and 118.

It is believed that the operation of the various forms of my differential amplifier will be apparent from the description given hereinabove. In the form shown in FIGURE 1 no feedback circuit is necessary for transistor 42 and the circuit puts out signals as indicated at the terminals 60, 62, and 64. In the form of my circuit shown in FIGURE 2, I employ the feedback circuit including battery 76 and transistor 70 to control the current through transistor 42 so that it will produce accurate outputs as indicated adjacent the output terminals of the circuit. When five or more inputs are to be handled, I use the form of my invention shown in FIGURE 3 in which a voltage divider splits input A to assist in controlling the current through transistor 42 to cause the circuit to produce the multiplicity of outputs shown. It will be remembered, of course, that in this form of my invention, as well as in the other forms I have shown, all the outputs are referenced to +10 volts. By reference to FIGURES 3 and 4 the relative values of the respective resistors 114, 116 and 48 of the circuit can be determined for any number of inputs.

From the foregoing description it will be seen that in each form of my invention I provide means comprising an amplifier device connected to the common conductor 40, which means has an operating point impedance and an incremental impedance such that the impedance at the conductor 40 is half the value of one of the emitter resistors of the branch circuits. The signal fed to this common amplifier device determines the operating point impedance. Stated otherwise I connect an amplifier device between the common conductor and one terminal of an impedance. In response to variation of the potential at conductor 40, I control the potential at the other terminal of the impedance to achieve the desired result.

It will be seen that I have accomplished the objects of my invention. I have provided a differential amplifier which is readily adapted to handle a very large number of inputs and to produce a multiplicity of addition and subtraction operations. The output of my circuit is not affected by loading of the circuit elements. My circuit is extremely simple for the result achieved.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A differential amplifier including in combination a plurality of first amplifier devices each having an output terminal and a reference terminal, a conductor, respective reference impedances of equal magnitude connecting said reference terminals to said conductor, common means comprising a second amplifier device having a reference terminal and a control terminal and having an output terminal connected to said conductor, said common means having an operating point impedance and having such incremental impedance value that the output impedance at said output terminal of said second amplifier device is half the magnitude of one of said reference impedances, means for applying a potential across said first amplifier device output terminals and said second amplifier device reference terminal, a source of external signal and means for coupling said source to said control terminal to control the operating point of said common impedance.

2. A differential amplifier including in combination a plurality of amplifier devices each having an output terminal and a reference terminal, a conductor, respective reference impedances of equal magnitude connecting said reference terminals to said conductor, common means comprising a negative impedance having a reference terminal and having an output terminal connected to said conductor and means for applying potential across said amplifier device output terminals and said negative impedance reference terminal, said negative impedance having an impedance characteristic such that the output impedance at said output terminal of said negative impedance is half the magnitude of one of said reference impedances.

3. A differential amplifier including in combination a plurality of amplifier devices each having an input terminal and a reference terminal and an output terminal, a common conductor, respective reference impedances of equal magnitude connecting said reference terminals to said conductor, means comprising a negative impedance having a reference terminal and having an output terminal connected to said conductor and means for applying a potential across said amplifier device output terminals and said negative impedance reference terminal, said negative impedance having a value of $-R/K$ where R is the value of one of said reference impedances and K is the number of amplifier devices less two.

4. A differential amplifier including in combination a plurality of amplifier devices each having a reference terminal and an input terminal and an output terminal, a common conductor, respective reference impedances of equal magnitude connecting said reference terminals to said conductor, means comprising a constant current source and a negative impedance having a reference terminal and having an output terminal connected to said conductor and means for applying a potential across said amplifier device output terminals and said negative impedance reference terminal, said negative impedance having a value equal to $-R/K$ where R is the value of the reference impedance and K is equal to the number of amplifier devices less two.

5. A differential amplifier including in combination a plurality of branch circuit amplifier devices each having a reference terminal and an input terminal and an output terminal, a common conductor, respective reference impedances of equal magnitude connecting said reference terminals to said conductor, means comprising a return path amplifier device having an input terminal and a reference terminal and having an output terminal connected to said common conductor, and means for applying a potential across said branch circuit amplifier device output terminals and said return path amplifier device reference terminal, said potential applying means comprising a feedback circuit and means connecting said feedback circuit between said common conductor and said return path amplifier device input terminal to control said return path amplifier device to cause the output impedance at said output terminal of said return path amplifier device to be half the value of said reference impedance.

6. A differential amplifier including in combination a plurality of first amplifier devices each having a reference terminal and an output terminal, a conductor, respective reference impedances of equal magnitude connecting said reference terminals to said conductor, a common amplifier device having an output terminal and a reference terminal, means connecting said output terminal of said common amplifier device to said conductor, an impedance having two terminals, means connecting one of said impedance terminals to said common amplifier device reference terminal, means for applying a potential across said first amplifier device output terminals and the other impedance terminal and means responsive to variations in the potential of said conductor for controlling the potential at the other impedance terminal in a like sense to said variations.

References Cited by the Examiner

UNITED STATES PATENTS 2,930,982 3/60 Patterson.

OTHER REFERENCES

Semiconductor Products, February 1961, Article by Beneteau, "The Design of High Stability D.C. Amplifiers," pages 27–30.

ROY LAKE, *Primary Examiner.*

ARTHUR GAUSS, *Examiner.*